United States Patent Office 3,192,066
Patented June 29, 1965

3,192,066
PROCESS FOR PREPARING MOISTURE-PROOF FILM
Maurice C. Raes, Branford, Conn., assignor to Olin Mathieson Chemical Corporation, New Haven, Conn., a corporation of Virginia
No Drawing. Filed June 12, 1961, Ser. No. 116,254
3 Claims. (Cl. 117—145)

This invention relates to the use of a novel self-anchoring agent in the preparation of cellophane coated with vinylidene chloride copolymers.

At present, vinylidene chloride copolymers are being employed rather extensively as coating materials for regenerated cellulose base sheet, and these coated films are characterized by excellent heat-seal and moistureproof values.

Compounds which have been copolymerized with vinylidene chloride for use as coating materials include acrylonitrile, acrylic acid and the alkyl esters of acrylic and methacrylic acids. However the most commonly used commercial material is a copolymer of about 90% vinylidene chloride and 10% acrylonitrile although small amounts of other constituents may be contained also. In any event, the vinylidene chloride is the major constituent of the copolymer. The copolymers containing these large amounts of vinylidene chloride are difficultly soluble in the lacquer solvents commonly used in the preparation of coated cellophanes, i.e., methyl ethyl ketone-toluene and ethyl acetate-toluene. Higher temperatures must be employed during coating operations and during any intermediate storage of coating lacquers to prevent the copolymer from precipitating from the lacquer solution, and in spite of such precautions solubility of such copolymers in these solvents is still marginal. Furthermore, there is a trend in the industry to utilize copolymers containing higher proportions of vinylidene chloride. These copolymers are even more insoluble in the commonly used lacquer solvents and coating operations using such copolymers are very difficult.

Recently there has been a shift to a tetrahydrofuran-toluene solvent for use with vinylidene chloride copolymer coating materials in the preparation of coated cellophanes since copolymers containing high proportions of vinylidene chloride are much more soluble in this solvent mixture than in those previously mentioned. The use of this improved solvent has eliminated the aforementioned difficulties with respect to solubility of vinylidene chloride copolymer, but another problem concerning the use of self-anchoring resins has evolved because of this solvent shift. "Self-anchoring" as used here means the improvement of adhesion of the coating material to the cellulose base sheet by incorporating some material in the solvent solution of the copolymer. This is in distinction to the more common "base sheet anchorage" wherein improved adhesion is achieved by incorporating a water-dispersible material such as a urea-formaldehyde or melamine-formaldehyde resin in the cellulose base sheet. Materials such as these offer certain process disadvantages.

One such self-anchoring agent is a copolymer of styrene and maleic anhydride such as exemplified by "Stromal AN" which contains a substantially equimolecular proportion of each monomer. This agent is normally employed by incorporating it in the coating lacquer, and during the drying of the coated film a firm adhesion of the coating to the base sheet is obtained. In the absence of some such anchoring agent, there is a tendency for the coatings to slough off the base sheet, and this is especially so in the presence of excessive amounts of moisture.

Unfortunately, it has been found that a styrene-maleic anhydride copolymer is nearly insoluble in the tetrahydrofuran-toluene solvent, and therefore the use of this self-anchoring agent in conjunction with this solvent system has not been possible.

Therefore one of the objects of this invention is to modify the styrene-maleic anhydride copolymer in such a way that it might be used as a self-anchoring agent in a tetrahydrofuran-toluene solvent. Still another object is to coat a regenerated cellulose sheet with a vinylidene chloride copolymer so as to obtain a coated film with improved anchorage and heat-seal values. Other objects will be apparent from or will be described in the subsequent discussion.

These objects have been accomplished in accordance with the present invention. It has been found that an amine modified styrene-maleic anhydride copolymer is quite soluble in a tetrahydrofuran-toluene solvent, and this material has been utilized as a self-anchoring agent in vinylidene chloride copolymer coating lacquers to obtain coated films having improved anchorage and heat sealability.

The following experiments will serve to illustrate the preparation of coated films by the coating of vinylidene chloride copolymers on a regenerated cellulose base sheet under different conditions. In the first example, no anchoring agent was used in the coating lacquer while the second and third examples illustrate the use of such agents. A styrene-maleic anhydride copolymer was used in the second experiment while an amine modified styrene-maleic anhydride copolymer was used in the third example.

*Example 1*

20 g. of "Saran F-242 LD," a copolymer of vinylidene chloride and acrylonitrile having approximately a 90% vinylidene chloride content, was dissolved in 48 g. of tetrahydrofuran and 32 g. of toluene at room temperature. Then 0.2 g. of beeswax and 0.1 g. of an aluminum silicate clay were added to promote the slip of the coated cellophane. This perfectly clear lacquer was used to coat a base sheet of softened regenerated cellulose on a laboratory coater using a dip and doctor process. The coating was dried in a forced air oven for 4.5 seconds at 130° C.

*Example 2*

The lacquer composition of Example 1 was again employed, but 0.2 g. of "Stromal AN" (1% calculated on the vinylidene chloride copolymer weight) was added to the solvents before the other ingredients. It was not possible to obtain a clear lacquer solution because of the insolubility of the styrene-maleic anhydride copolymer in the solvents. However a base sheet of softened regenerated cellulose was coated with the lacquer and dried as in Example 1.

*Example 3*

The lacquer composition of Example 1 was again used, but 6 g. of a solution of modified "Stromal AN" was added together with the other ingredients. The amine modified styrene-maleic anhydride copolymer solution was made as follows: 10 g. of "Stromal AN" was dispersed in 60 g. of tetrahydrofuran and 40 g. of toluene, the dispersion was heated to 60° C. and 0.5 g. of stearylamine was added while stirring. The dispersion cleared slowly to a slightly viscous solution. It was calculated that 1.5% of the carboxyl groups in the styrene-maleic anhydride copolymer had reacted with the amine. This amount was sufficient to solubilize the copolymer in the solvent mixture used. The amount of solution added to the lacquer corresponds to 3% of dry amine modified styrene-maleic anhydride copolymer calculated on the weight of vinylidene chloride copolymer present in the lacquer.

It is noted that the resin, as modified in Example 3, gives a clear viscous solution in a 60-40 solvent of tetrahydrofuran and toluene. In Example 2, the commercially obtained styrene-maleic anhydride copolymer was not soluble in the lacquer solvent, and it was only possible to prepare a dispersion of the resin. The advantages inherent in using this modified anchoring resin may be readily observed by reference to the following table which shows various properties of the coated films prepared in Examples 1–3.

|  | Ex. 1 | Ex. 2 | Ex. 3 |
|---|---|---|---|
|  | Lacquer without anchoring agent | Lacquer with "Stromal AN" | Lacquer with modified "Stromal AN" |
| Coating weight, g./m.$^2$ | 2.4 | 2.3 | 2.2 |
| Coating anchorage in water at 75° C., minutes to fail | 20 | 30 | >300 |
| Heat seal at 75° F./35% R.H., g. | 35 | 215 | 310 |
| Heat seal at 75° F./81% R.H., g. | 0 | 35 | 50 |
| Heat seal at low pressure, sealed at 300°F., g. | 35 | 70 | 110 |
| Appearance | Clear | Hazy | Clear |

In the first two examples wherein no anchoring agent or the unmodified styrene-maleic anhydride copolymer was used, very poor anchorage of coating to the base sheet was obtained. Furthermore, heat-seal values of both coated films were low. However in Example 3 where the amine modified resin was employed, significantly improved anchorage and heat-seal values were obtained. The film containing unmodified styrene-maleic anhydride copolymer was hazy and as such would be unsuitable as a transparent wrapping material. Attempts to incorporate more than 1% of the unmodified resin in the tetrahydrofuran-toluene were completely unsatisfactory due to the insolubility of the resin. In such attempts anchorage values did not increase substantially over those obtained when 1% unmodified resin was used, and even more opaque films were obtained.

On the other hand, the amine modified resin at 3% concentration (based on vinylidene chloride copolymer weight in lacquer) is quite soluble in the tetrahydrofuran-toluene solvent. When this resin is utilized in the tetrahydrofuran-toluene system, a clear transparent coated film is obtained with greatly improved anchorage and heat-seal values. The advantages of the modified copolymer over the styrene-maleic anhydride copolymer are obvious.

These improved results have also been obtained when the styrene-maleic anhydride copolymer is modified with octylamine, dodecylamine and oleylamine. In general, primary aliphatic amines having from 8–18 carbon atoms in the alkyl chain may be utilized to obtain the desired modification.

For best results, it is preferred that about 0.5–15% of the carboxyl groups in the copolymer be reacted with the aliphatic amine employed. If an excessive amount of the available carboxyl groups are reacted with the amines, the important self-anchoring characteristic of the copolymer will be adversely affected.

Good anchorage and heat-seal values have been obtained when the amine modified copolymer is used in amounts of 1–10% based on the weight of vinylidene chloride copolymer in the lacquer solution, but the best results are obtained when 3–5% of the modified copolymer is utilized.

The amine modified styrene-maleic anhydride copolymer is especially useful as a self-anchoring agent in a tetrahydrofuran-toluene lacquer solvent system, but it can also be used as a self-anchoring agent in the other solvent systems commonly used in the coating of regenerated cellulose base sheets, such as methyl ethyl ketone-toluene and ethyl acetate-toluene.

No acidic catalyst is required to activate reaction of this amine modified copolymer, and this represents an advantage over the use of other self-anchoring agents such as the urea- and melamine-formaldehyde resins. Prepared lacquer solutions containing the modified copolymer remain stable for weeks.

What is claimed is:

1. A process for preparing a flexible, transparent and moistureproof sheet material which comprises forming a lacquer solution of a vinylidene chloride copolymer and 1–10% by weight of said copolymer of a self-anchoring agent in a tetrahydrofuran-toluene solvent, said copolymer being formed by the polymerization of vinylidene chloride with a compound selected from the class consisting of acrylonitrile, acrylic acid and the alkyl esters of acrylic and methacrylic acids, said self-anchoring agent being the product formed by the reaction of a primary aliphatic amine having 8–18 carbon atoms with about 0.5–15% of the carboxy groups in a styrene-maleic anhydride copolymer, coating a base sheet of regenerated cellulose with said lacquer solution, and heating said coated sheet to evaporate said solvent and to provide sheet material having said coating firmly anchored to said regenerated cellulose base sheet.

2. The process of claim 1 wherein a vinylidene chloride-acrylonitrile copolymer is utilized in the lacquer solution.

3. The process of claim 1 wherein the self-anchoring agent is used in an amount of 3–5% by weight based on vinylidene chloride copolymer content in said lacquer solution.

References Cited by the Examiner

UNITED STATES PATENTS

| 2,650,172 | 8/53 | Brillhart | 117—76 |
| 2,673,191 | 3/54 | Wolf | 260—45.5 |
| 2,909,449 | 10/59 | Banigan | 117—145 |
| 2,990,391 | 6/61 | Grantham | 117—143 XR |
| 3,085,030 | 4/63 | Hendrickson et al. | 117—145 |

WILLIAM D. MARTIN, *Primary Examiner.*

RICHARD D. NEVIUS, JOSEPH REBOLD,
*Examiners.*